UNITED STATES PATENT OFFICE.

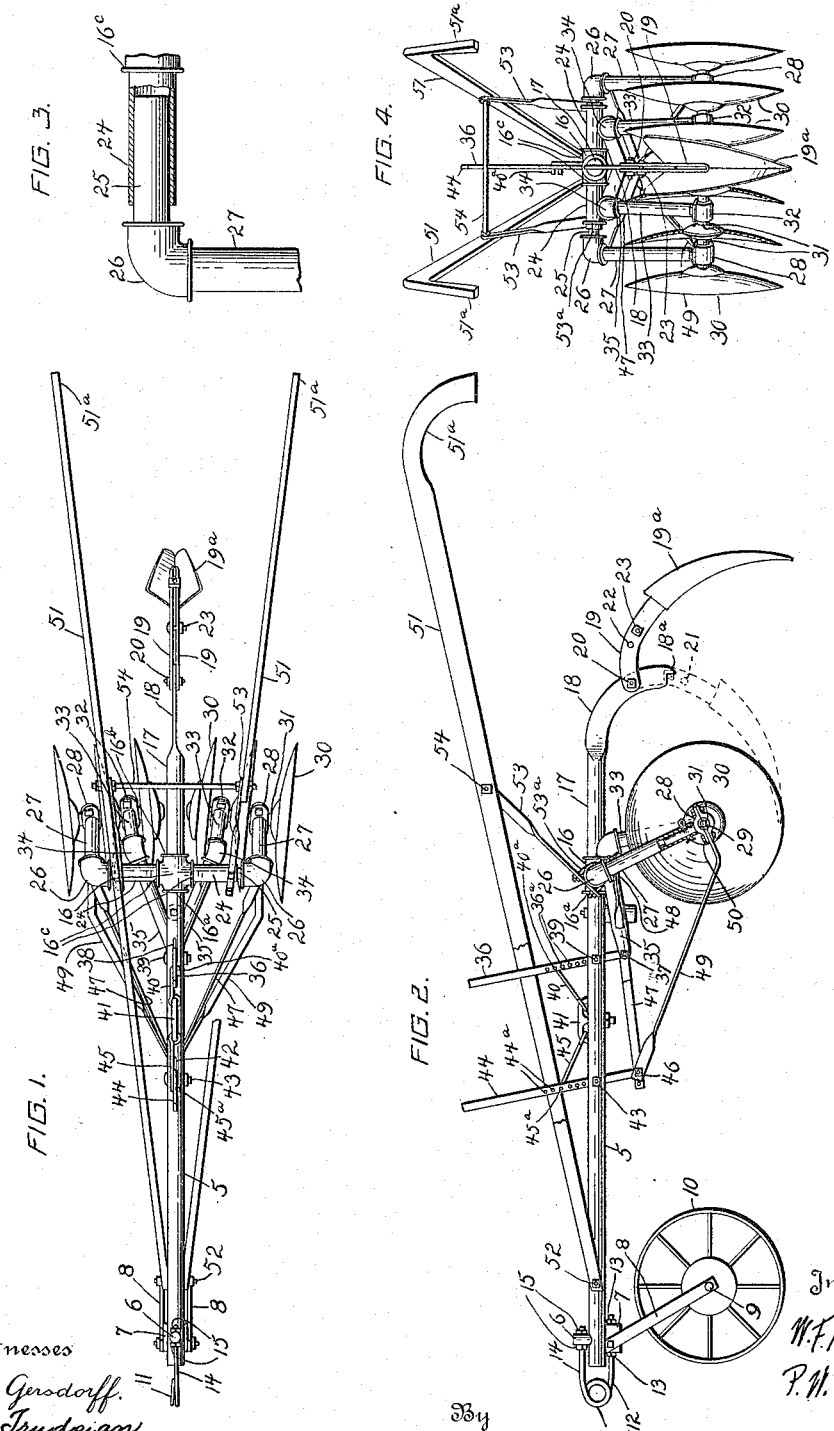

WILLIAM F. NOLZE AND PHILIP W. FOLTZ, OF CHILLICOTHE, OHIO.

GROUND IMPLEMENT.

1,127,917. Specification of Letters Patent. Patented Feb. 9, 1915.

Application filed January 31, 1914. Serial No. 815,730.

*To all whom it may concern:*

Be it known that we, WILLIAM F. NOLZE and PHILIP W. FOLTZ, citizens of the United States, residing at Chillicothe, in the county of Ross and State of Ohio, have invented certain new and useful Improvements in Ground Implements, of which the following is a specification, reference being had therein to the accompanying drawing.

This invention provides a ground-working implement, of the nature of a disk plow or cultivator, containing certain novel features, including means whereby the distance between two gangs of earth-working devices may be altered and means for changing the angle of the devices with respect to the line of draft.

Among other things, the invention contemplates an implement of this character in which pipe and other material of standard form easily obtainable in the market can be used in the formation of the frame and provision of other parts.

When read in connection with the description herein, the details of construction and arrangement of parts contemplated by the invention will be apparent from the accompanying drawing, forming part hereof, wherein an embodiment of the invention is disclosed, for purposes of illustration.

While the embodiment disclosed now is considered a preferable one, it is to be understood that it is not the intention to be limited necessarily thereto in interpretation of claims, as it is apparent that changes within the scope of the claims can be made without departing from the nature and spirit of the invention.

Like reference-characters refer to corresponding parts in the views of the drawing, of which—

Figure 1 is a plan view; Fig. 2 is a side view; Fig. 3 is a sectional view of the slidable or telescopic joint that permits the distance between the gangs to be altered; and Fig. 4 is an end view.

The frame of the implement includes a central beam 5, preferably of comparatively large pipe material. In the front end portion of the beam is pivoted a substantially vertical pin 6, having on its lower end a block 7, upon which the beam rests. The implement is supported at its front end by standards 8 secured at their upper ends to the block and having at their lower ends an axle 9 on which is journaled a caster-wheel 10 between the standards. A substantially U-shaped member 11 has one of its limbs, 12, secured to the block by being disposed therethrough and held thereon by nuts 13, and the other limb, 14, secured to the pin 6 above the beam by being placed through the pin and held thereon by nuts 15. The upper limb 14 operates to prevent the pin from becoming disengaged from the beam. The member 11 serves as a means for attaching a draft-animal to the implement, it is disposed substantially in the plane of the caster-wheel, and, as it is swung to one side or the other, in an obvious manner, when the draft-animal changes its course, the caster-wheel is caused correspondingly to turn and follow the course.

A four-way right-angular coupling 16 has the rear end of the beam 5 secured in one of its sockets, $16^a$, and in the opposite socket, $16^b$, is secured the front end of a central frame member or beam extension 17, preferably of material and size similar to beam 5. The rear end portion of member 17 is flattened and turned downwardly as a standard 18. Two strap members 19 are secured pivotally one on each side of the standard by a bolt 20 near their upper ends positioned above the lower end of the standard, and these straps have a shovel-plow $19^a$ fast thereon. The strap members 19 between the plow and the bolt 20 have two holes 21 and 22 adapted to receive a bolt 23. The lower end of the standard has a depending lug $18^a$. When the bolt is disposed in the hole 21, which is nearer to the plow, it clears the lower end of the standard and the plow is free to trail, or to be swung upwardly when the bolt rests on the top of the curved portion or standard; and, when the bolt is placed in the other hole, 22, which is nearer the pivotal point of the straps, the plow is held in operative position by contact of the bolt with the lug $18^a$.

In the lateral sockets $16^c$ are secured transverse or laterally-extending substantially horizontal frame members 24, each of which has therein a slidable or telescopic member or pipe section 25 extending outwardly of the free end. The free end of each section 25 has thereon a downturned coupling 26, in each of which is secured a downwardly-extending standard 27. Each standard has at its lower end a boxing 28, in which is carried a disk-axle 29. Disks 30 or other ground-working devices are carried by the axle, one outside of the boxing and the other inside thereof, and the devices of each axle are maintained in proper spaced relation by the boxing 28, spacing-washers 31, and a boxing 32 on the axle.

Secured to each boxing 32 is an adjusting-standard 33, on the upper end of which is a right-angular coupling 34. In each coupling 34 there is secured a connecting member 35, and the two connecting members extend forwardly from the couplings in which they are secured and converge to a place beneath the beam 5 and in front of the coupling 16. A lever 36 is secured between and to the front end portions of the connecting members by a pivot-pin 37. The lever extends upwardly from the pivot-pin through a slot 38 in the beam 5 and it is fulcrumed on a pin 39 disposed through the beam. The lever 36 above the beam has therein a series of longitudinally-arranged holes 36a, any one of which is capable of receiving the turned end 40a of a link 40 pivotally secured at its other end to a socket member 41 on top of the beam 5. By swinging the lever forwardly or rearwardly, the standards 33 are moved rearwardly or forwardly to alter the angle of the axles 29, and thereby that of the earth-working devices thereon, with respect to the line of draft, and the axles are held in adjusted positions by placing the end 40a of the link in one or another of the holes in the lever, wherein it is held by a cotter-pin 40b. The standards 27 and 33 are capable of sufficient turning in the couplings 26 and 34 to permit the swinging of the axles under the influence of the lever. The connecting members 35 contact with the under sides of the transverse frame members 24, whereby the axles are prevented from being distorted upwardly upon the stresses to which they are subjected in use.

At a place in the beam 5 in advance of the lever 36 there is a slot 42, in which is fulcrumed on a pivot-pin 43 a lever 44 extending above and below the beam. This lever in its portion above the beam has a series of longitudinally-arranged holes 44a, any one of which is capable of receiving the turned end 45a of a link 45 pivotally secured at its other end to the socket member 41, which is between the two levers. To the lower end of lever 44 there are pivotally secured on each side by a bolt 46 strap members 47 extending thence to the upper portions of the standards 27, to which they are pivotally secured by a shackle 48, and a strap 49 extending to the boxing 28 on the lower ends of those standards to which they are pivotally secured by a bolt 50.

The front lever 44 may be moved backwardly or forwardly to cause the sections 25 to move outwardly or inwardly of the frame members 24, and thus cause through the instrumentality of the straps 47 the distance between the two gangs of earth-working elements to be increased or decreased, the pivotal connection of the connecting members 35 to the rear lever 36 being sufficiently loose to permit this movement. If it is found during adjusting movement that the sections 25 bind and prevent their movement under the influence of the lever 44, the adjusting movement may be assisted by laterally-directed blows of a hammer or other suitable implement until the adjusted position is attained, when the link 45 is put into engagement with the lever to hold the parts against further relative movement. The drag on the earth-working devices is sustained by the lower straps 49, the standards 33, connecting members 35, and the levers.

Handle-bars 51 are secured at their front ends to the front portion of the central beam 5 by a bolt 52, and they diverge rearwardly therefrom to handles 51a at the rear. In the rear portions the handle-bars are secured to the transverse frame members 24 by braces or straps 53 attached at their lower ends to those members by loops 53a and at their upper ends to the handle-bars by a bolt or rod 54 extending between the bars.

Having thus described our invention, what we claim as new, and desire to secure by Letters Patent, is—

1. A ground-implement comprising a central beam having a four-way coupling in its rear portion, frame members extending laterally from said coupling on each side of said beam, sections carried by and rotatably and slidably adjustable with respect to said frame members, a standard extending downwardly from the outer end of each of said sections, an axle having thereon a gang of earth-working devices connected to each standard, another standard connected to each axle at another place and movably connected to said beam, and means whereby said sections are held in adjusted positions.

2. A ground-working implement comprising a frame having transverse members, a standard depending from each of said members, an axle having thereon a gang of earth-working devices connected to each standard, another standard connected to each axle at another place and having a connecting member extending forwardly from its upper portion, a lever on said beam connected to said connecting members, another lever on said beam, and a link connecting the lower ends of the standards depending from the transverse members and said last-mentioned lever, and means whereby said levers are held in adjusted positions.

In testimony whereof we affix our signatures in presence of two witnesses.

WILLIAM F. NOLZE.
PHILIP W. FOLTZ.

Witnesses:
　FORREST C. SECREST,
　LOUIS A. HIBBLER.